United States Patent
Yamaguchi

(10) Patent No.: US 7,812,961 B2
(45) Date of Patent: Oct. 12, 2010

(54) METHOD, APPARATUS, AND PROGRAM FOR PROCESSING TOMOGRAPHIC IMAGES

(75) Inventor: Yoshitaka Yamaguchi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 392 days.

(21) Appl. No.: 12/047,701

(22) Filed: Mar. 13, 2008

(65) Prior Publication Data
US 2008/0225301 A1 Sep. 18, 2008

(30) Foreign Application Priority Data
Mar. 14, 2007 (JP) ............... 2007-064497

(51) Int. Cl.
*G01B 9/02* (2006.01)
(52) U.S. Cl. ...................... 356/479; 356/497
(58) Field of Classification Search ................. 356/477, 356/479, 497; 702/167; 382/131, 266
See application file for complete search history.

(56) References Cited

U.S. PATENT DOCUMENTS

| | | | |
|---|---|---|---|
| 2003/0103212 A1* | 6/2003 | Westphal et al. | 356/479 |
| 2005/0140984 A1* | 6/2005 | Hitzenberger | 356/497 |
| 2006/0171503 A1* | 8/2006 | O'Hara et al. | 378/21 |
| 2007/0263227 A1* | 11/2007 | Mujat et al. | 356/497 |

FOREIGN PATENT DOCUMENTS

JP 2006-189424 A 7/2006

OTHER PUBLICATIONS

Yoshiaki Yasuno, et al., "Three-dimensional and high-speed swept-source optical coherence tomography for in vivo investigation of human anterior eye segments", Optical Express, 2005, pp. 10652-10664, vol. 13, No. 26.

* cited by examiner

*Primary Examiner*—Samuel A Turner
(74) *Attorney, Agent, or Firm*—Sughrue Mion, PLLC

(57) ABSTRACT

Image quality of tomographic images obtained by optical tomographic measurement is improved. Spatial frequency processes are administered on a tomographic image, with the frequency processing properties (high frequency gain) in the scanning direction of a measuring light beam set to be lower than the frequency processing properties (high frequency gain) in the direction of the optical axis of the measuring light beam. For example, a smoothing process that removes high frequency components is administered to the tomographic image only in the scanning direction. Alternatively, a sharpening process that emphasizes high frequency components is administered to the tomographic image only in the direction of the optical axis. As a further alternative, a smoothing process that removes high frequency components is administered to the tomographic image in the scanning direction, then a sharpening process that emphasizes high frequency components is administered to the tomographic image in the direction of the optical axis.

9 Claims, 11 Drawing Sheets

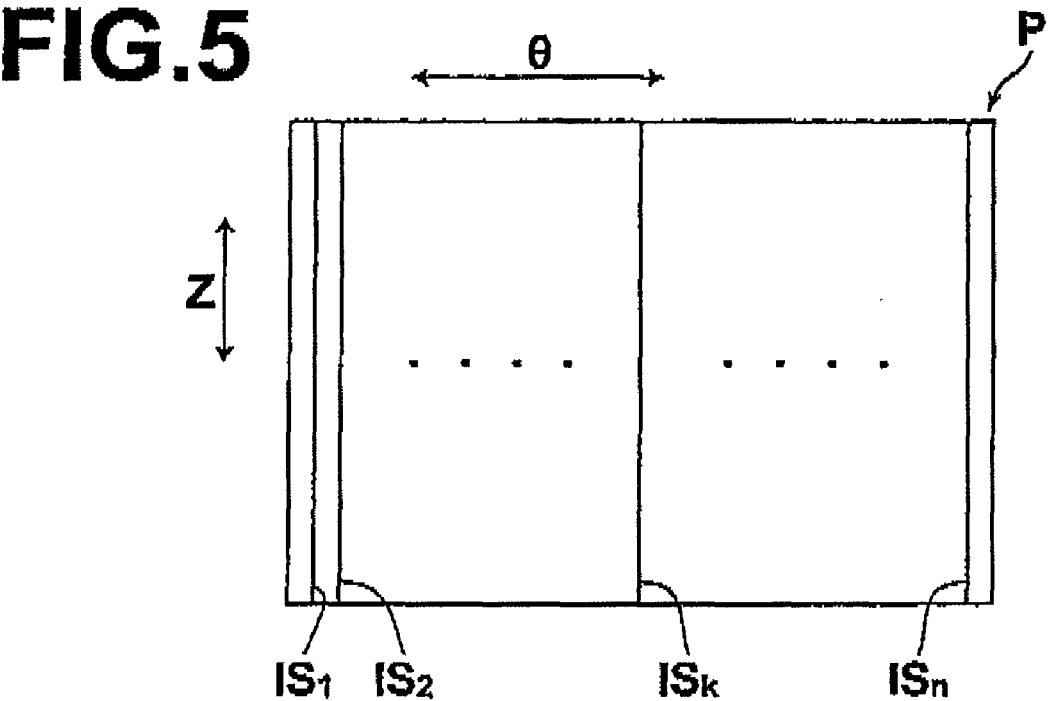
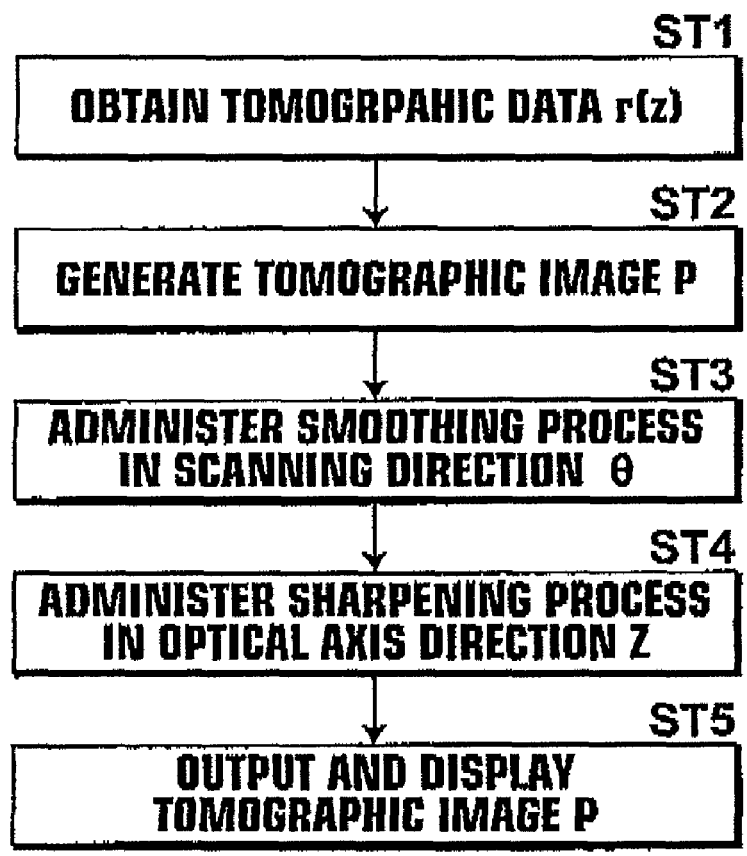

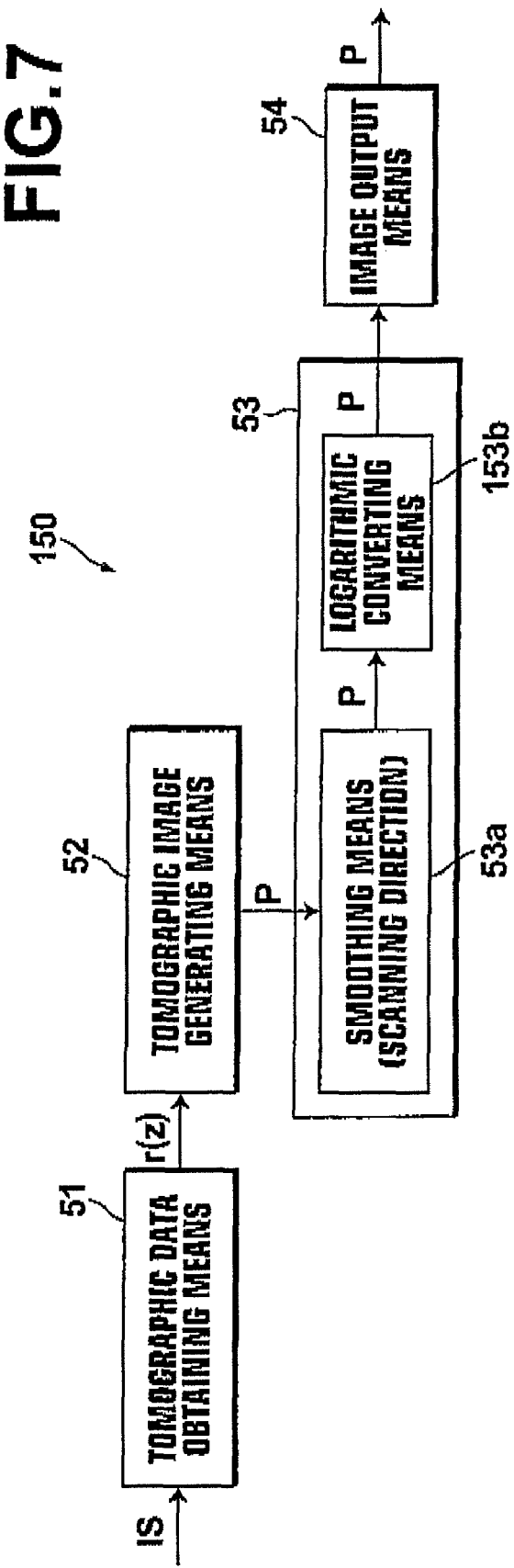

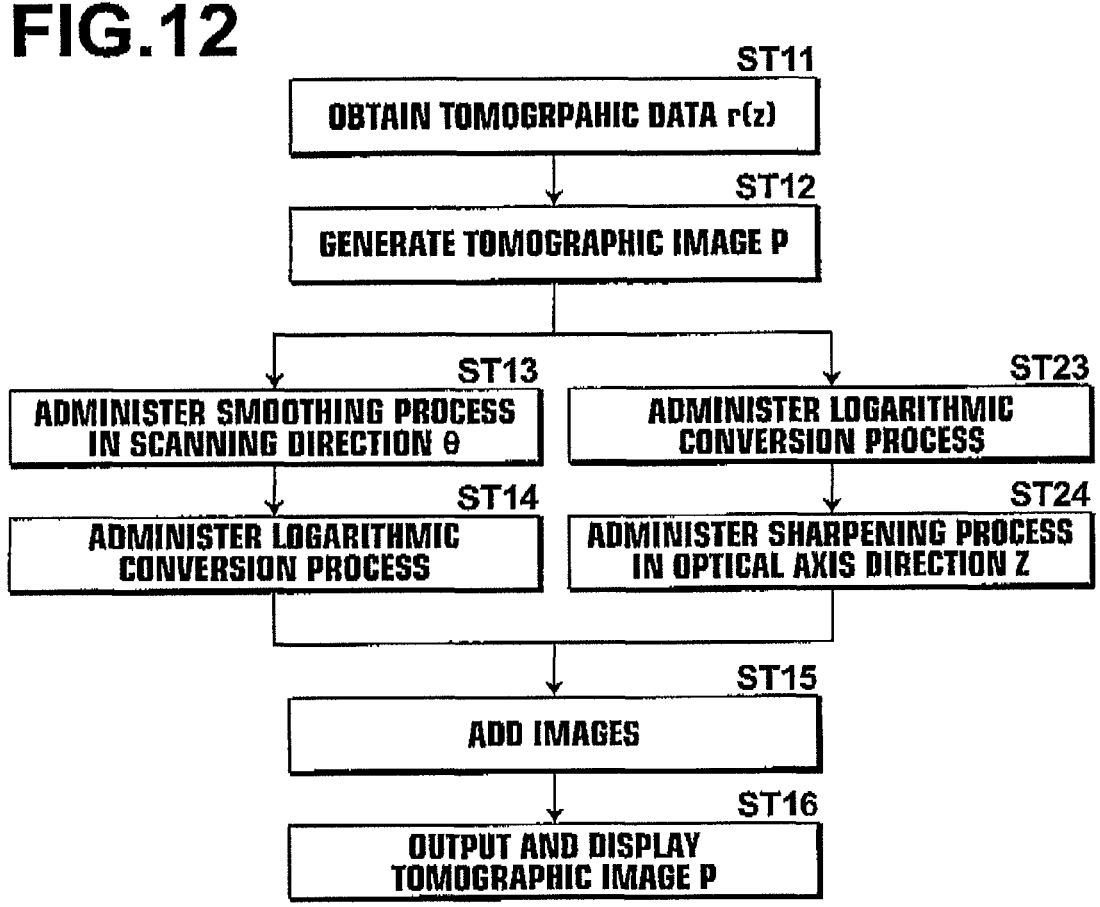

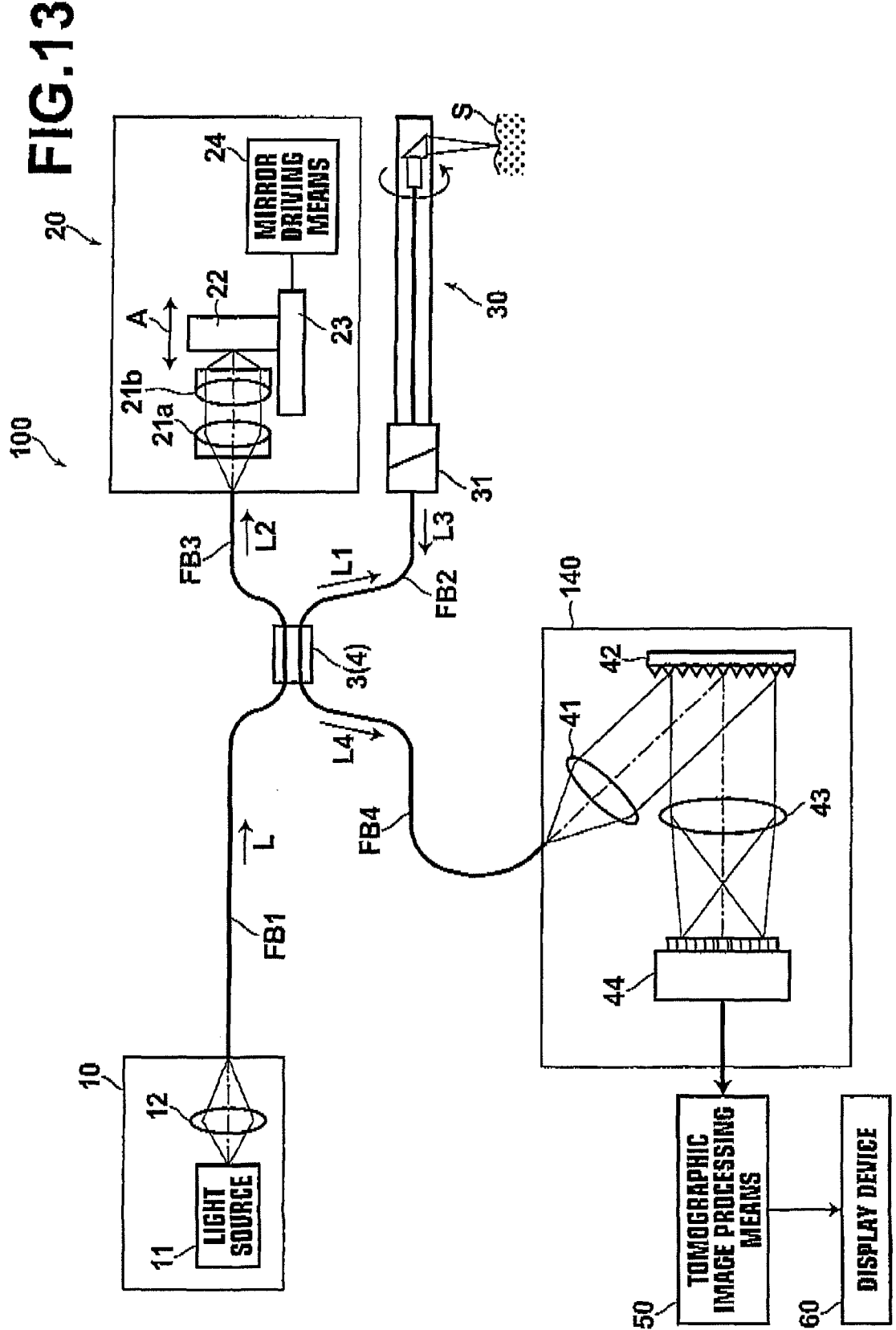

US 7,812,961 B2

METHOD, APPARATUS, AND PROGRAM FOR PROCESSING TOMOGRAPHIC IMAGES

BACKGROUND OF THE INVENTION

1. Field of the Invention

The present invention relates to a method, an apparatus, and a program for processing tomographic images, that generate optical tomographic images using OCT (Optical Coherence Tomography).

2. Description of the Related Art

Conventionally, optical tomographs that utilize OCT measurement are employed to obtain tomographic images of living tissue. In an optical tomograph, a low coherence light beam emitted from a light source is divided into a measuring light beam and a reference light beam. Thereafter, a reflected light beam, which is the measuring light beam reflected by a measurement target when the measuring light beam is irradiated onto the measurement target, is combined with the reference light beam. Tomographic images are obtained, based on the intensity of a interference light beam obtained by combining the reflected light beam and the reference light beam. There are some optical tomographs that utilize TD-OCT (Time Domain Optical Coherence Tomography) measurement. In TD-OCT measurement, the measuring position in the depth direction (hereinafter, referred to as "depth position") within a measurement target is changed, by changing the optical path length of the reference light beam.

Recently, OCT apparatuses that generate optical tomographic images at high speeds without changing the optical path length of the reference light beam, by utilizing FD-OCT (Fourier Domain Optical Coherence Tomography) measurement, have been proposed. SD-OCT (Spectral Domain Optical Coherence Tomography) measurement and SS-OCT (Swept Source Optical Coherence Tomography) measurement are two types of FD-OCT measurement (refer to Japanese Unexamined Patent Publication No. 2006-189424, and Y. Yasuno et al., "Three-dimensional and high-speed swept-source optical coherence tomography for in vivo investigation of human anterior eye segments", OPTICS EXPRESS, Vol. 13, No. 26, pp. 10652-10664, 2005). In SD-OCT measurement, low coherence light beam having a predetermined wavelength band is divided into a measuring light beam and a reference light beam by a Michelson interferometer, to obtain tomographic images. In SS-OCT measurement, the frequency of a laser beam emitted from a light source is swept. Reflected light beams of each wavelength are caused to interfere with the reference light beam. The intensities of reflected light beams at a depth positions within a measurement target are obtained by administering Fourier analysis on interference spectra for the series of wavelengths. The tomographic images are obtained employing the detected intensities.

In the aforementioned OCT measurement, the measuring light beams are irradiated on the measurement targets while being scanned. The tomographic images are generated, by arranging tomographic data obtained in the depth direction of the measurement targets (the direction of the optical axis of the measuring light beams) in the scanning directions.

The tomographic images obtained by the aforementioned OCT measurement have different properties in the scanning directions and the optical axis directions of the measuring light beams. Accordingly, when processes to improve the image quality of the tomographic images are administered, there is a problem that desired image quality improvements cannot be obtained, if uniform image processing conditions are applied in both the scanning directions and the optical axis directions of the measuring light beam.

SUMMARY OF THE INVENTION

The present invention has been developed in view of the foregoing circumstances. It is an object of the present invention to provide a method, an apparatus, and a program for processing tomographic images, which is capable of improving the image quality of tomographic images.

The tomographic image processing method of the present invention comprises:

emitting a light beam;

dividing the emitted light beam into a measuring light beam and a reference light beam;

combining a reflected light beam, which is the measuring light beam reflected by a measurement target, with the reference light beam;

detecting the interference light beam formed by the combined reflected light beam and the reference light beam as an interference signal;

generating the tomographic image based on a plurality of the interference signals, which are detected while scanning and irradiating the measuring light beam on the measurement target; and administering a spatial frequency process, with the high frequency gain for the tomographic image with respect to the scanning direction of the measuring light beam set lower than the high frequency gain for the tomographic image with respect to the direction of the optical axis of the measuring light beam.

The tomographic image processing apparatus of the present invention comprises:

a light source unit, for emitting a light beam;

light dividing means, for dividing the emitted light beam into a measuring light beam and a reference light beam;

combining means, for combining a reflected light beam, which is the measuring light beam reflected by a measurement target, with the reference light beam;

interference light detecting means, for detecting the interference light beam formed by the combined reflected light beam and the reference light beam as an interference signal;

tomographic image generating means, for generating the tomographic image based on a plurality of the interference signals, which are detected while scanning and irradiating the measuring light beam on the measurement target; and image quality correcting means, for administering a spatial frequency process, with the high frequency gain for the tomographic image with respect to the scanning direction of the measuring light beam set lower than the high frequency gain for the tomographic image with respect to the direction of the optical axis of the measuring light beam.

The tomographic image processing program of the present invention causes a computer to execute the procedures of:

emitting a light beam;

dividing the emitted light beam into a measuring light beam and a reference light beam;

combining a reflected light beam, which is the measuring light beam reflected by a measurement target, with the reference light beam;

detecting the interference light beam formed by the combined reflected light beam and the reference light beam as an interference signal;

generating the tomographic image based on a plurality of the interference signals, which are detected while scanning and irradiating the measuring light beam on the measurement target; and administering a spatial frequency process, with the high frequency gain for the tomographic image with respect to the scanning direction of the measuring light beam set lower than the high frequency gain for the tomographic image with respect to the direction of the optical axis of the measuring light beam.

Here, "with the high frequency gain for the tomographic image with respect to the scanning direction of the measuring light beam set lower than the high frequency gain for the tomographic image with respect to the direction of the optical axis of the measuring light beam" refers to a smoothing process that removes high frequency components being administered to the tomographic image only in the scanning direction. Alternatively, "with the high frequency gain for the tomographic image with respect to the scanning direction of the measuring light beam set lower than the high frequency gain for the tomographic image with respect to the direction of the optical axis of the measuring light beam" refers to a sharpening process that emphasizes high frequency components being administered to the tomographic image only in the direction of the optical axis. That is, the "spatial frequency process" is administered in a state in a state in which the high frequency components are suppressed in the direction of the optical axis of the measuring light beam compared to the high frequency components in the scanning direction of the measuring light beam.

Further, the image quality correcting means is not limited to that which performs the spatial frequency process in only one of the aforementioned directions. The image quality correcting mean may comprise: a smoothing means, for administering a smoothing process on the tomographic image with respect to the scanning direction of the measuring light beam; and a sharpening means, for administering a sharpening process on the tomographic image with respect to the direction of the optical axis of the measuring light beam. In this case, the sharpening means may administer a sharpening process with respect to the optical axis direction of the measuring light beam, on a tomographic image which has been smoothed by the smoothing means. Alternatively, the sharpening means may comprise: high frequency component extracting means, for extracting high frequency components from the tomographic image, and an adding means, for adding the extracted high frequency components to the tomographic image, which has been smoothed by the smoothing means.

Note that when both the smoothing process in the scanning direction of the measuring light beam and the sharpening process in the optical axis direction of the measuring light beam are administered, the aforementioned sharpening means and smoothing means may administer the spatial frequency processes separately. Alternatively, a two dimensional filter may be employed to perform the smoothing process and the sharpening process simultaneously.

In the case that the smoothing process is administered on the tomographic image with respect to the scanning direction of the measuring light beam, the image correcting means may administer a logarithmic conversion process to the smoothed tomographic image.

Note that the light source unit may be that which emits a light beam while periodically sweeping the wavelength thereof within a wavelength band, to enable obtainment of tomographic images by SS-OCT measurement. Alternatively, the light source unit may be that which emits a low coherence light beam of a predetermined wavelength band, to enable obtainment of tomographic images by SD-OCT or TD-OCT measurement.

Note that the tomographic image processing program of the present invention may be provided being recorded on computer readable media. Those who are skilled in the art would know that computer readable media are not limited to any specific type of device, and include, but are not limited to: floppy disks; RAM's; ROM's; CD's; magnetic tapes; hard disks; and internet downloads, by which computer instructions may be transmitted. Transmission of the computer instructions through a network or through wireless transmission means is also within the scope of the present invention. In addition, the computer instructions may be in the form of object, source, or executable code, and may be written in any language, including higher level languages, assembly language, and machine language.

Each of the method, apparatus, and program for processing tomographic images of the present invention emits a light beam; divides the emitted light beam into a measuring light beam and a reference light beam; combines a reflected light beam, which is the measuring light beam reflected by a measurement target, with the reference light beam; detects the interference light beam formed by the combined reflected light beam and the reference light beam as an interference signal; and generates the tomographic image based on a plurality of the interference signals, which are detected while scanning and irradiating the measuring light beam on the measurement target. Then, a spatial frequency process is administered, with the high frequency gain for the tomographic image with respect to the scanning direction of the measuring light beam set lower than the high frequency gain for the tomographic image with respect to the direction of the optical axis of the measuring light beam. Thereby, image correction having different properties can be administered on the tomographic image obtained by OCT measurement, to match the characteristics of the tomographic image in the scanning direction and the optical axis direction of the measuring light beam. Accordingly, the image quality of the tomographic image can be improved.

Note that the image quality correcting means may administer a smoothing process on the tomographic image with respect to only the scanning direction of the measuring light beam. In this case, noise and artifacts, which are caused by fluctuations in the wavelength of the measuring light beam that occur in the scanning direction, can be reduced. Therefore, the image quality of the tomographic image can be improved.

Alternatively, the image quality correcting means may administer a sharpening process on the tomographic image with respect to only the optical axis direction of the measuring light beam. In this case, blurring, which is caused by the light dispersion/absorption properties of the measurement target, can be reduced. Therefore, the image quality of the tomographic image can be improved.

Further, the image quality correcting means may comprise the smoothing means, for administering a smoothing process on the tomographic image with respect to the scanning direction of the measuring light beam; and the sharpening means, for administering a sharpening process on the tomographic image with respect to the direction of the optical axis of the measuring light beam. In this case, the aforementioned noise and artifacts in the scanning direction as well as blurring in the optical axis direction can be reduced. Therefore, the image quality of the tomographic image can be improved.

The sharpening means may comprise: the high frequency component extracting means, for extracting high frequency components from the tomographic image; and the adding means, for adding the extracted high frequency components to the tomographic image, which has been smoothed by the smoothing means. In this case, the high frequency components are extracted from the tomographic image prior to the smoothing process being administered. Therefore, sufficient sharpening effects can be obtained.

The image quality correcting means may administer a logarithmic conversion process on the tomographic image following a smoothing process is administered on the tomographic image with respect to the scanning direction of the measuring light beam. In this case, the effects of the smoothing process are not reduced compared to a case in which the smoothing process is administered after the differences in density among adjacent lines are spread by the logarithmic conversion.

BRIEF DESCRIPTION OF THE DRAWINGS

FIG. 5 is a diagram that illustrates an example of a tomographic image which is generated by a tomographic image generating means of FIG. 4.

FIG. 6 is a flow chart that illustrates the steps of a tomographic image processing method according to a preferred embodiment of the present invention.

FIG. 7 is a block diagram that illustrates the schematic construction of a tomographic image processing apparatus according to a second embodiment of the present invention.

FIG. 12 is a flow chart that illustrates the steps of an exemplary operation by the tomographic image processing apparatus of FIG. 11.

FIG. 13 is a diagram that illustrates the schematic construction of another example of a tomographic imaging system to which the present invention is applied.

BEST MODE FOR CARRYING OUT THE INVENTION

Figure 1:
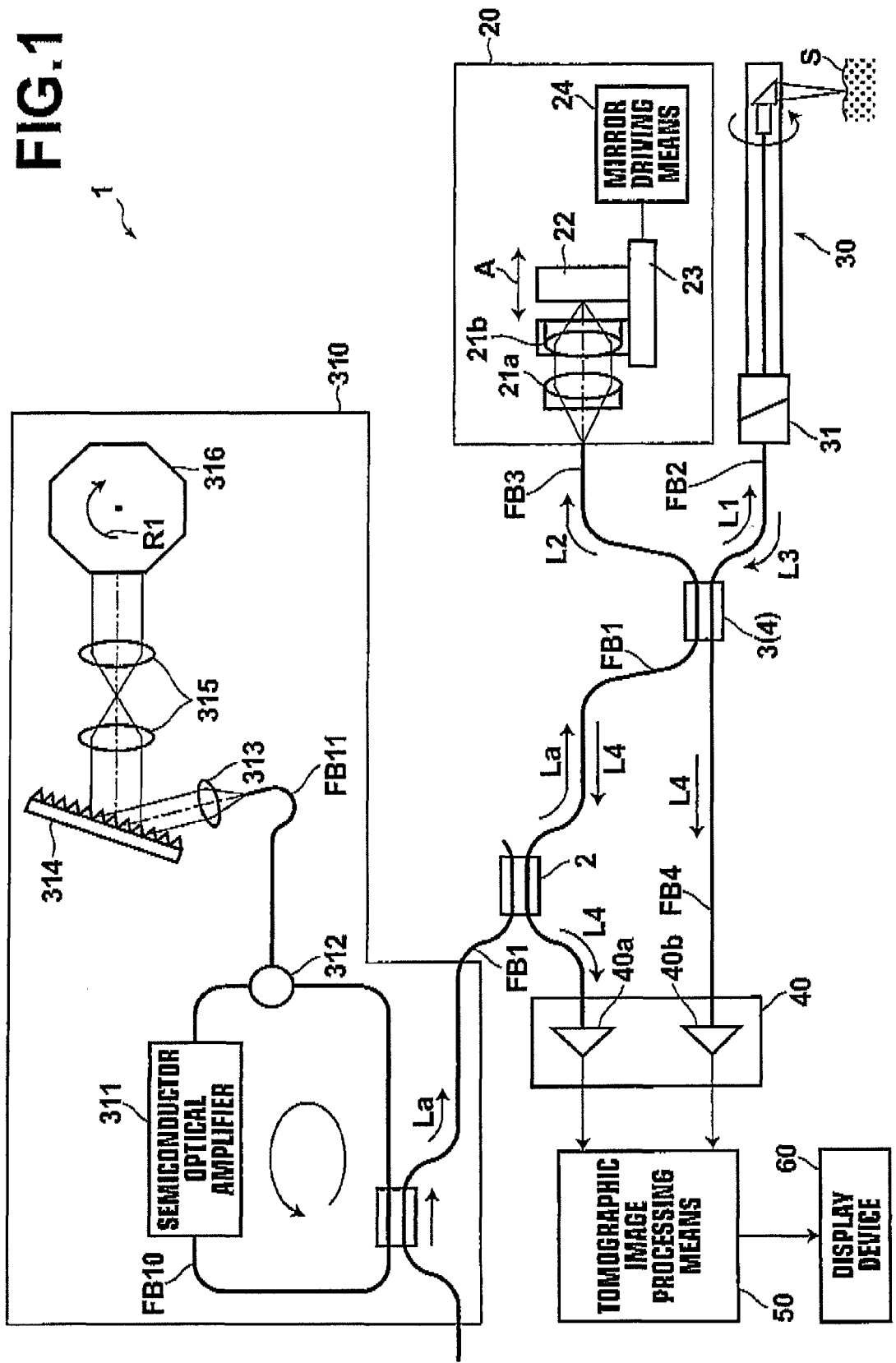
FIG. 1 is a diagram that illustrates the schematic construction of an optical tomography system according to a preferred embodiment of the present invention.
Figure 2:
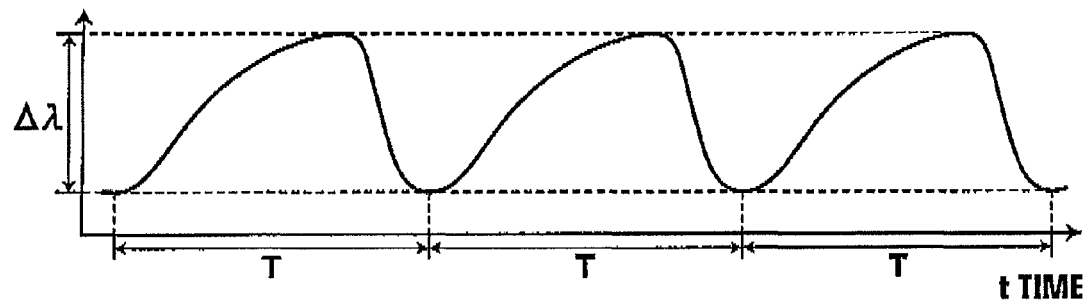
FIG. 2 is a graph that illustrates the manner in which the wavelength of light emitted from a light source unit of the tomographic imaging system of FIG. 1 is swept.

Hereinafter, an embodiment of the optical tomographic imaging system that employs the tomographic image processing apparatus according to the present invention will be described in detail, with reference to the attached drawings. FIG. 1 is a diagram that illustrates the schematic construction of an optical tomography system 1 according to a preferred embodiment of the present invention. The optical tomography system 1 obtains tomographic images P of measurement targets, which are living tissue, cells, and the like within body cavities, using SS-OCT (Swept Source Optical Coherence Tomography). The optical tomography system 1 comprises: a light source unit 310, for emitting a light beam L; a light dividing means 3, for dividing the light beam L emitted by the light source unit 310 into a measuring light beam L1 and a reference light beam L2; a combining means 4, for combining the reference light beam L2 with a reflected light beam L3 (back scattered light), which is the measuring light beam L1 reflected at depth positions within the measurement target; an interference light detecting means 20, for detecting an interference light beam L4, which is formed by combining the reference light beam L2 and the reflected light beam L3, as interference signals IS; and a tomographic image processing apparatus 50, for generating tomographic images from the interference signals IS detected by the interference light detecting means 20.

The light source unit 310 emits the laser beam L while sweeping the wavelength thereof within a predetermined wavelength band $\Delta\lambda$. Specifically, the light source unit 310 comprises: a semiconductor optical amplifier 311 (semiconductor gain medium); and an optical fiber FB10. The optical fiber FB10 is connected to both ends of the semiconductor optical amplifier 311. The semiconductor optical amplifier 311 functions to emit a slight amount of light into a first end of the optical fiber FB10, when a drive current is injected thereinto, and to amplify the light that enters it from a second end of the optical fiber FB10. When the drive current is supplied to the semiconductor optical amplifier 311, the laser beam L is emitted into the optical fiber FB10 as a pulsed laser beam, from an optical resonator formed by the semiconductor optical amplifier 311 and the optical fiber FB10.

Further, an optical divider 312 is linked to the optical fiber FB10, and a portion of the light beam that propagates within the optical fiber FB10 is emitted from the optical divider 312 into an optical fiber FB11. The light beam, which is emitted from the optical fiber FB11, passes through a collimating lens 313, a diffraction grating 314, and an optical system 315, to be reflected by a rotating polygon mirror 316. The light reflected by the rotating polygon mirror 316 passes through the optical system 315, the diffraction grating 314, and the collimating lens 313, to reenter the optical fiber FB11.

The rotating polygon mirror 316 rotates in the direction indicated by arrow R1, to vary the angle of each reflective surface thereof with respect to the optical axis of the optical system 315. Thereby, only a light beam having a specific wavelength band, from among the light spectrally decomposed by the diffraction grating 314, is returned to the optical fiber FB11. The wavelength of the light beam that reenters the optical fiber FB11 is determined by the angle formed by the optical axis of the optical system 315 and the reflective surface of the rotating polygon mirror 316. The light beam that reenters the optical fiber FB11 is caused to enter the optical fiber FB10 by the optical divider 312. As a result, the laser beam L having the specific wavelength is emitted toward an optical fiber FB1a.

Accordingly, when the rotating polygon mirror 316 is rotated in the direction of arrow R1 at a constant speed, and the wavelength $\lambda$ of the light beam that enters the optical fiber FB1a is varied over time, at a constant period. The laser light beam L, of which the wavelength is swept at a constant period, is emitted toward the optical fiber FB1 from the light source unit 310 in this manner.

The light dividing means 3 is constituted by a 2×2 optical fiber coupler, for example. The light dividing means 3 functions to divide the laser beam L, which emitted by the light source unit 310 and guided through the optical fiber FB1, into the measuring light beam L1 and the reference light beam L2. The light dividing means 3 is optically connected to optical fibers FB2 and FB3. The measuring light beam L1 enters the optical fiber FB2, and the reference light beam L2 enters the optical fiber FB3. Note that in the present embodiment, the light dividing means 3 also functions as the combining means 4.

Figure 3:
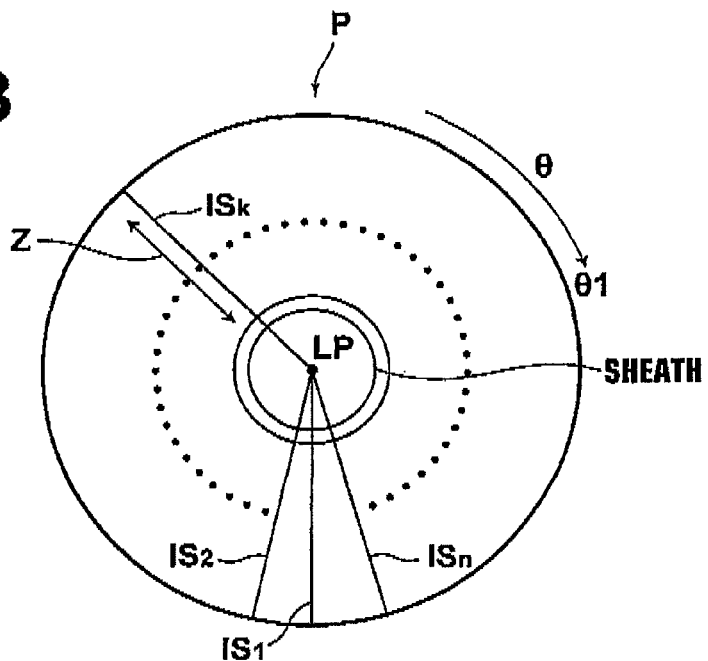
FIG. 3 is a diagram that schematically illustrates the manner in which an optical probe of FIG. 2 scans and irradiates a measuring light beam on a measurement target.

An optical probe 30 is optically connected to the optical fiber FB2. The measuring light beam L1 is guided through the optical fiber FB2 into the optical probe 30. The optical probe 30 is to be inserted into body cavities via a forceps opening and a forceps channel, for example, and is removably attached to the optical fiber FB2 via an optical connector 31. As illustrated in FIG. 3, an optical fiber within a sheath of the optical probe 30 rotates in the direction of arrow θ1, to irradiate the measuring light beam L1 onto the measurement target S while scanning the measuring light beam L1 in the direction of arrow θ1. The optical probe 30 guides the reflected light beam L3, which is the measuring light beam L1 reflected by the measurement target S, toward the combining means 4.

Meanwhile, an optical path length adjusting means 20 is provided at the end of the optical fiber FB3 from which the reference light beam L2 is emitted. The optical path length adjusting means 20 changes the optical path length of the reference light beam L2 in order to adjust the region at which tomographic images are obtained. The optical path length adjusting means 20 comprises: a collimating lens 21 and a mirror 22. The reference light beam L2 passes through the collimating lens 21, is reflected by the mirror 22, and reenters the optical fiber FB3 via the collimating lens 21.

Here, the mirror 22 is fixed on a movable stage 23. The movable stage 23 is movable in the direction indicated by arrow A by a mirror driving means 24. The optical path length of the reference light beam L2 is changed, by moving the movable stage in the direction of arrow A.

The combining means 4 is constituted by a 2×2 optical fiber coupler. The combining means 4 combines the reference light beam L3, of which the optical path length has been changed by the optical path length adjusting means 20, and the reflected light beam L3, which has been reflected by the measurement target S. The combining means 4 also splits the combined light beam into two light beams, to enter the interference light detecting means 40 via optical fibers FB1 and FB4, respectively.

The interference light detecting means 40 is constituted by photodiodes or the like. The interference light detecting means 40 detects the interference light beam L4 formed by the combined reference light beam L2 and the reflected light beam L3, and outputs the detected interference light beam L4 as interference signals IS. Note that in the present embodiment, a configuration is adopted, wherein the interference light beam L4 is split into two light beams by the combining means 4, and the light beams are guided to photodetectors $40a$ and $40b$, such that balanced detection is performed.

Next, an example of the operation of the optical tomographic imaging system described above will be described. First, the optical path length is adjusted such that the measurement target S is positions within a measurable region, by moving the movable stage 23 in the direction of arrow A. Thereafter, the light beam L is emitted from the light source unit 310. The light beam L is divided into the measuring light beam L1 and the reference light beam L2 by the light dividing means 3. The measuring light beam L1 is guided into a body cavity via the optical probe 30, and irradiated onto the measurement target S. The reflected light beam L3, which is reflected by the measurement target S, is combined with the reference light beam L2, which is reflected by the mirror 22, by the combining means 4. The interference light beam L4 formed by combining the reflected light beam L3 and the reference light beam L2 is detected by the interference light detecting means 40 as an interference signal IS.

The optical fiber within the optical probe 30 is rotated in the direction of arrow θ1, to scan the measuring light beam L1 one dimensionally with respect to the measurement target S. Data regarding the depth direction of the measurement target S (direction z of the optical axis of the measuring light beam L1) is obtained along each portion of the measurement target S along the scanning direction θ, and a plurality of interference signals IS are obtained regarding the cross section along the scanning direction θ. The tomographic image processing apparatus 50 obtains a tomographic image P based on the plurality of interference signals IS. Note that the measuring light beam L1 may also be scanned and irradiated onto the measurement target S in a second direction (the longitudinal direction of the optical probe 30) perpendicular to the aforementioned scanning direction, to obtain tomographic images P that also include cross sections in the second direction.

Figure 4:
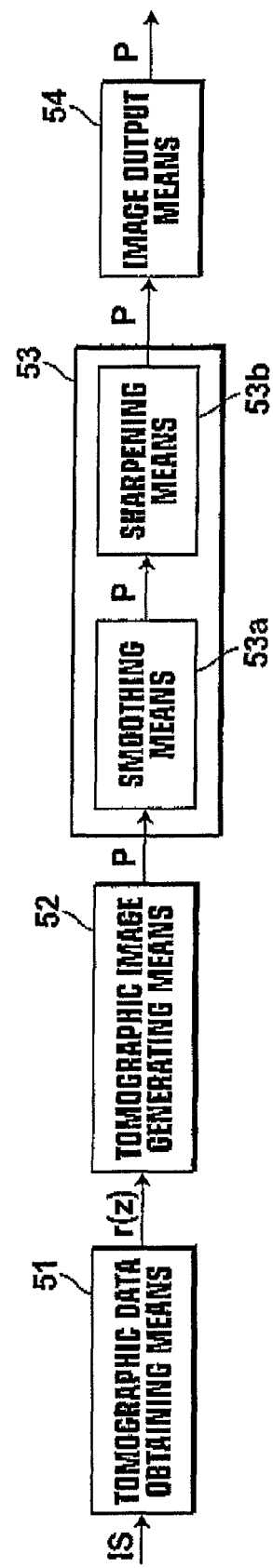
FIG. 4 is a block diagram that illustrates the construction of the tomographic image processing apparatus according to a preferred embodiment of the present invention.

FIG. 4 is a block diagram that illustrates the construction of the tomographic image processing apparatus 50 according to a preferred embodiment of the present invention. The tomographic image processing apparatus 50 will be described with reference to FIG. 4. Note that the configuration of the optical tomographic image processing apparatus 50 illustrated in FIG. 4 is realized by executing a tomographic image processing program, which is read out form an auxiliary memory device on a computer (such as a personal computer). At this time, the tomographic image processing program may be distributed being recorded in recording media such as CD-ROM's, or via a network such as the Internet, and installed in the computer.

The tomographic image processing means 50 administers frequency analysis on the interference signals IS detected by the interference light detecting means 40, obtains tomographic data (reflectance) r(z) regarding various depth positions of measurement targets S, and generates tomographic images P. The generated tomographic images P are displayed on a display device 60. The tomographic image processing means 50 comprises: a tomographic data obtaining means 51; a tomographic image generating means 52; an image quality correcting means 53; and an image output means 54.

The tomographic data obtaining means 51 obtains tomographic data detected by the interference light detecting means 40. The tomographic data obtaining means 51 obtains tomographic data corresponding to a single line each time that the interference light detecting means 40 obtains interference signals IS corresponding to a single line. The tomographic data obtaining means 51 employs known spectral analysis techniques, such as the Fourier transform process, the Maximum Entropy Method (MEM), and the Yule-Walker method, to successively obtain tomographic data (reflectance) r(z). Note that the tomographic data obtaining means 51 may convert the interference signals IS, which are detected by the interference light detecting means 40 with respect to changes in wavelength λ (time), to interference signals IS with respect to changes in wave numbers k (k=2π/λ). Note that the details of the signal converting method are disclosed in the specification of U.S. Pat. No. 5,956,355.

The tomographic image generating means 52 illustrated in FIG. 4 generates a single tomographic image from the tomographic data corresponding to the plurality of lines, which are successively obtained by the tomographic data obtaining means 51. Specifically, the tomographic image generating means 52 stores the tomographic data r(z) corresponding to one period of wavelength sweeping by the light source unit 310, as tomographic data r(z) corresponding to a single line. Further, the tomographic image generating means 52 stores the tomographic data r(z) which are successively obtained during scanning of the measuring light beam L1 on the measurement target S by the optical probe 30. Thereafter, the tomographic image generating means 52 generates the tomographic image P using the stored tomographic data r(z) corresponding to n lines. For example, if the wavelength sweeping frequency of the light source unit is 20 kHz, and the optical probe 30 scans the measuring light beam L1 in the scanning direction θ1 at 20 Hz, the tomographic image generating means 52 generates the tomographic image P with 1024 pieces of tomographic data corresponding to n=1024 lines. Note that the tomographic image generating means 52 generates the tomographic image P as an image in which the tomographic data r(z) corresponding to each of the lines, obtained by scanning the measuring light beam L1 in the direction of arrow θ1, are arranged linearly, as illustrated in FIG. 5. The tomographic image P is generated in this manner to be suitable for processing by the image quality correcting means 53.

The image quality correcting means 53 of FIG. 4 administers a spatial frequency process on the tomographic image P, with frequency processing properties (high frequency gain) for the measuring light beam L1 in the scanning direction θ (the direction θ in FIG. 5) within the tomographic image P set lower than the frequency processing properties (high frequency gain) for the measuring light beam L1 in the direction of the optical axis thereof (the direction z in FIG. 5, corresponding to the depth direction within the measurement target S).

Specifically, the image quality correcting means 53 comprises: a smoothing means 53a; and a sharpening means 53b. The smoothing means 53a administers a smoothing process on the tomographic image P that removes high frequency components with respect to the scanning direction θ therein. The smoothing process may employ known techniques, such as the moving average method and a median filter. The sharpening means 53b administers a sharpening process on the tomographic image P, which has been smoothed by the smoothing means 53a, that emphasizes the high frequency components (edges) with respect to the optical axis direction z. The edge emphasizing process may employ known techniques, such as a process that employs a high frequency emphasizing filter and an emphasizing process that employs a blur mask. The image output means 54 outputs the tomographic image P, of which the image quality has been corrected by the image quality correcting means 53, to the display device 60 illustrated in FIG. 1. Note that the image output means 54 may output the tomographic image P such that the tomographic data r(z) (pixels) corresponding to each line are rearranged in a circular shape along the scanning direction θ. Alternatively, the image output means 54 may output the tomographic image P such that the tomographic data r(z) (pixels) corresponding to each line are arranged linearly, as illustrated in FIG. 5.

Fluctuations among the lines can be suppressed and the image will appear more natural, by the smoothing means 53a administering the smoothing process on the tomographic image P with respect to the scanning direction θ, and thereby, the image quality can be improved. That is, when tomographic images are obtained by OCT measurement, the light source unit, the interferometer, and the like do not exhibit reproducible characteristics over time. Specifically, in the case of the aforementioned SS-OCT measurement, it is difficult for the light source unit 310 to sweep the wavelength of the emitted light beam with stable and accurate frequency sweeping characteristics for each period, and the frequency sweeping characteristics may fluctuate from period to period.

Accordingly, when the measuring light beam L1 is scanned and irradiated, and tomographic data corresponding to a single line is obtained for each period of wavelength sweeping, the tomographic data for each line will have been obtained with different frequency characteristics. As a result, fluctuations in density will occur in the tomographic image P in the scanning direction θ of the measuring light beam L1, with some lines having high density, and some lines having extremely low density. That is, image quality will deteriorate, because these types of noise and artifacts will occur in the tomographic image P in the scanning direction θ. Therefore, the smoothing means 53a administers the smoothing process on the tomographic image P with respect to the scanning direction θ, density fluctuations among the lines are suppressed, and the image quality is improved.

Further, the sharpening process is administered on the tomographic image P with respect to the optical axis direction z. Thereby, a correct emphasizing process is administered on the tomographic P, an image in which structures can be clearly visually recognized is generated, and image quality is improved. That is, when the measuring light beam L1 is irradiated onto the measurement target S to obtain a tomographic image P by OCT measurement, there are cases in which interference waveforms change due to attenuation of light within specific wavelength bands, caused by the light dispersion/absorption properties which are dependent on wavelengths of the interferometer or the measurement target S. When tomographic data are obtained from the interference signals IS, of which the interference waveforms are changed, the tomographic image P becomes blurred. Therefore, the sharpening means 53b administers the sharpening process on the tomographic image P with respect to the optical axis direction z. Thereby, the blurs caused by the dispersion/absorption properties are sharpened, and the image quality of the tomographic image P is improved.

FIG. 6 is a flow chart that illustrates a preferred embodiment of the tomographic image processing method of the present embodiment. The tomographic image processing method will be described with reference to FIGS. 1 through 6. First, the tomographic data obtaining means 51 administers frequency analysis on the interference signals IS detected by the interference light detecting means 40, and successively obtains tomographic data r(z) corresponding to each line (step ST1). Then, the tomographic image generating means 52 generates a tomographic image P, employing the obtained tomographic data r(z) corresponding to a plurality of the lines (step ST2).

Next, the image quality correcting means 53 administers image quality correcting processes on the tomographic image P. Specifically, first, the smoothing means 53a administers a smoothing process on the tomographic image P with respect to the scanning direction θ (step ST3). Then, the sharpening means 53b administers a sharpening process on the tomographic image P, on which the smoothing process has been administered, with respect to the optical axis direction z (step ST4). Thereafter, the image output means 54 outputs the tomographic image P, of which the image quality has been corrected, to the display device 60 (step ST5).

In this manner, the smoothing process is administered on the tomographic image P with respect to the scanning direction θ, and the sharpening process is administered on the tomographic image P with respect to the optical axis direction z. Thereby, the aforementioned noise and artifacts in the scanning direction θ as well as blurring in the optical axis direction z can be reduced. Therefore, the image quality of the tomographic image P is improved.

Note that the image quality correcting means 53 illustrated in FIG. 4 is described as an example that administers both the smoothing process and the sharpening process. Alternatively, the image quality correcting means 53 may administer only the smoothing process on the tomographic image P with respect to the scanning direction θ. As a further alternative, the image quality correcting means 53 may administer only the sharpening process on the tomographic image P with respect to the optical axis direction z.

FIG. 7 is a block diagram that illustrates the schematic construction of a tomographic image processing apparatus 150 according to a second embodiment of the present invention. The tomographic image processing apparatus 150 will be described with reference to FIG. 7. Note that elements of the tomographic image processing apparatus 150 of FIG. 7 which are the same as those of the tomographic image processing apparatus 50 of FIG. 4 will be denoted by the same reference numerals, and detailed descriptions thereof will be omitted, unless particularly necessary.

The tomographic image processing apparatus 150 of FIG. 7 differs from the tomographic image processing apparatus 50 of FIG. 4 in the constitution of an image quality correcting means 153. Specifically, the image quality correcting means 153 only administers the smoothing process in the scanning direction θ, and also administers a logarithmic conversion process on the tomographic image P after the smoothing process. That is, the image quality correcting means 153 comprises a logarithmic converting means 153*b* downstream from the smoothing means 53*a*. The logarithmic converting means 153*b* is equipped with a logarithmic conversion table such as that illustrated in FIG. 8. The logarithmic converting means 153*b* functions to perform logarithmic conversion on the pixel values of the tomographic image P, on which the smoothing process has been administered in the scanning direction θ, and outputs the converted pixel values.

Figure 9A:
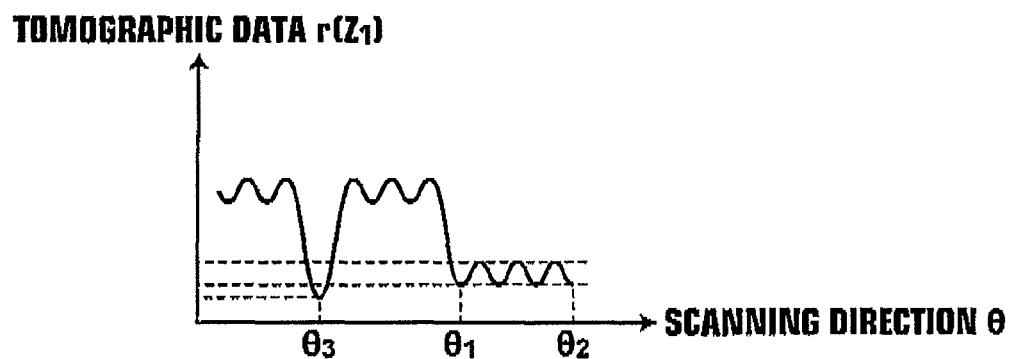
FIGS. 9A, 9B, and 9C are graphs that illustrate the manner in which tomographic data obtained by the tomographic image processing apparatus of FIG. 7 are arranged in a scanning direction, undergo a smoothing process, then undergo a logarithmic conversion process.
Figure 9B:
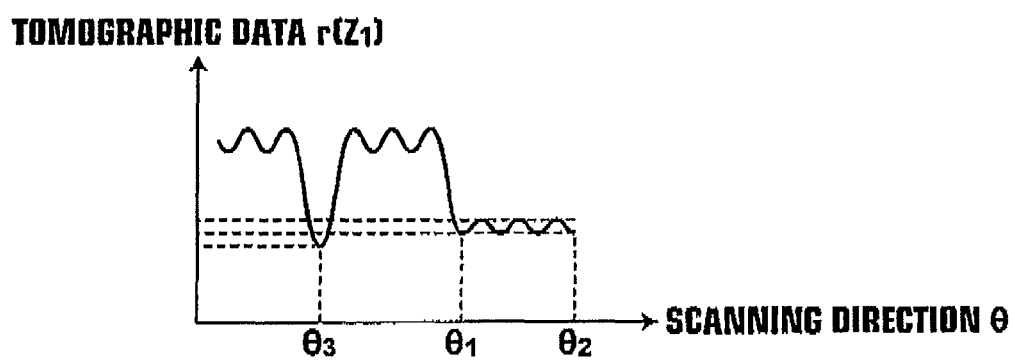
Figure 9C:
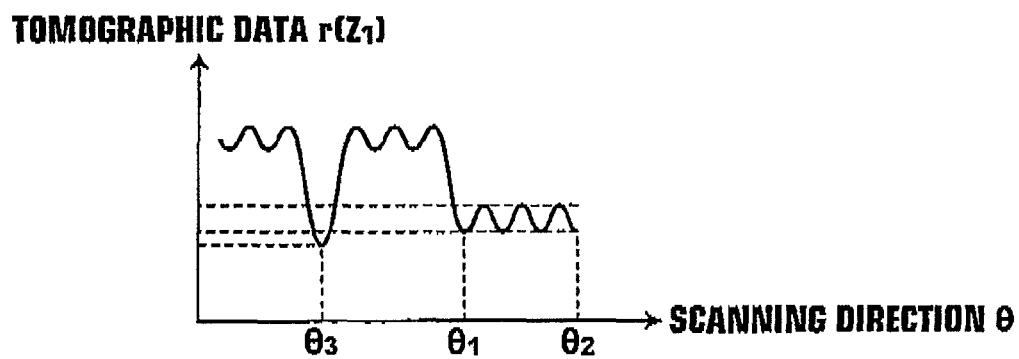
Figure 10A:
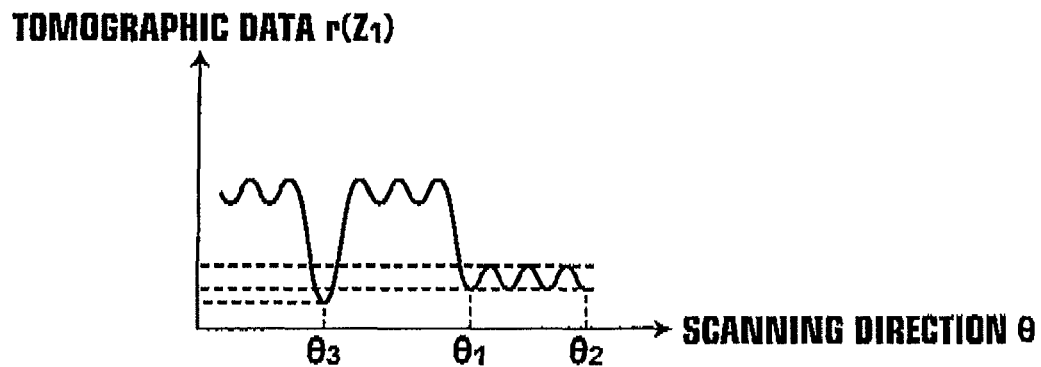
FIGS. 10A, 10B, and 10C are graphs that illustrate the manner in which tomographic data obtained by the tomographic image processing apparatus of FIG. 7 are arranged in a scanning direction, undergo a logarithmic conversion process, then undergo a smoothing process.
Figure 10B:
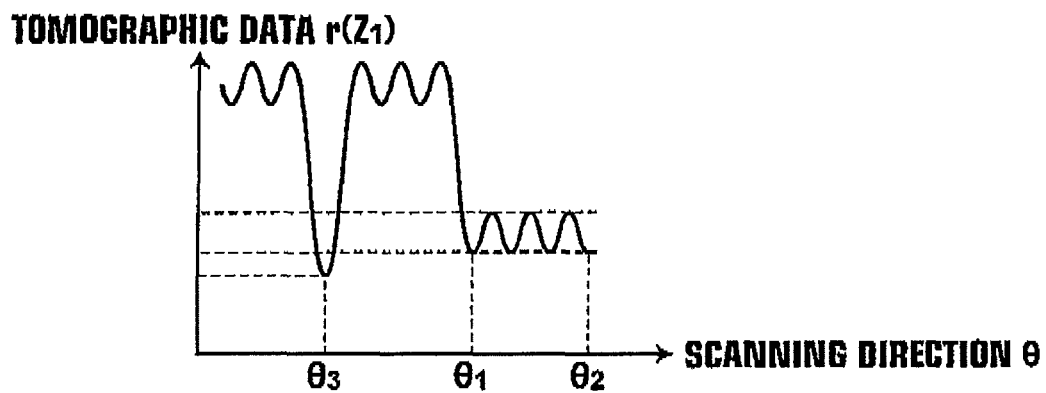
Figure 10C:
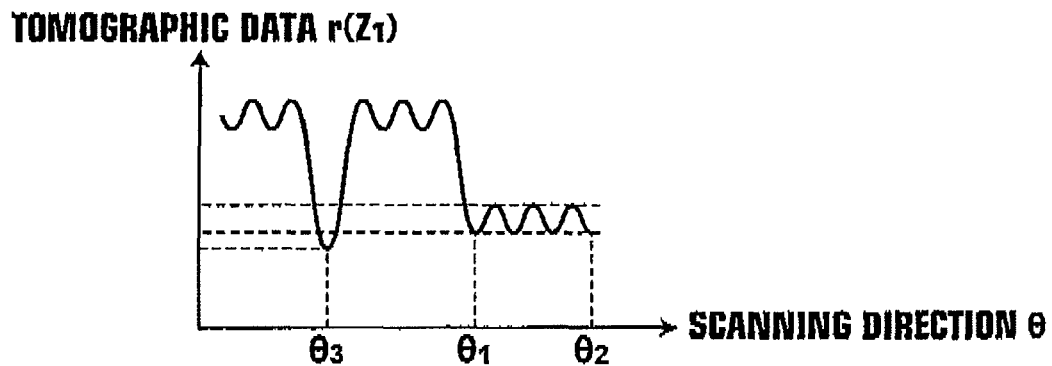

A wide dynamic range is realized, and image quality is improved, by administering the logarithmic conversion process on the tomographic image P after the smoothing process is administered thereon in the scanning direction θ. For example, when pieces of tomographic data r(z1) regarding a depth position z1 are arranged in the scanning direction θ, the tomographic data r(z1) (pixel values) may be represented as illustrated in the graph of FIG. 9A. The smoothing process is administered on the tomographic image P, as illustrated in FIG. 9B, then the logarithmic conversion process is administered as illustrated in FIG. 9C. Then, in the region from θ1 to θ2, where the tomographic data r(z1) are small, noise is suppressed and the image quality is improved, because the smoothing process is administered prior to the signal differences among adjacent lines within the region from θ1 to θ3 are increased by the logarithmic conversion process. That is, noise components caused by increases in signal differences can be suppressed, compared to a case in which tomographic data r(z) undergo a logarithmic conversion process prior to a smoothing process, as illustrated in FIGS. 10A through 10C. Note that tomographic data r(z) having small signal values, which are present in the optical axis direction Z, are not suppressed, because the smoothing process is administered on the tomographic image P only with respect to the scanning direction θ.

In addition, administering the smoothing process on the tomographic image P with respect to the scanning direction θ is equivalent to reducing density differences among adjacent lines. Accordingly, greater improvements in image quality can be obtained by administering the smoothing process on the tomographic image P illustrated by the graph of FIG. 9A, to cause the tomographic data at scanning position θ3 to approach the tomographic data of adjacent lines as illustrated in the graph of FIG. 9B, and then administering the logarithmic conversion process as illustrated in FIG. 9C. That is, a reduction in the effects of the smoothing process can be reduced, compared to a case in which the density differences among adjacent lines are increased by a logarithmic conversion process as illustrated in FIG. 10B, then the smoothing process is administered as illustrated in FIG. 10C.

Note that the logarithmic converting means may be provided in the image quality correcting means 53 of FIG. 1 as well. In this case, the logarithmic converting means may be provided downstream from the smoothing means 53*a* of FIG. 4. The smoothing process, the logarithmic conversion process, and the sharpening process may be administered on the tomographic image P in this order, by the smoothing means 53*a*, the logarithmic converting means, and the sharpening means 53*b*, respectively.

Figure 11:
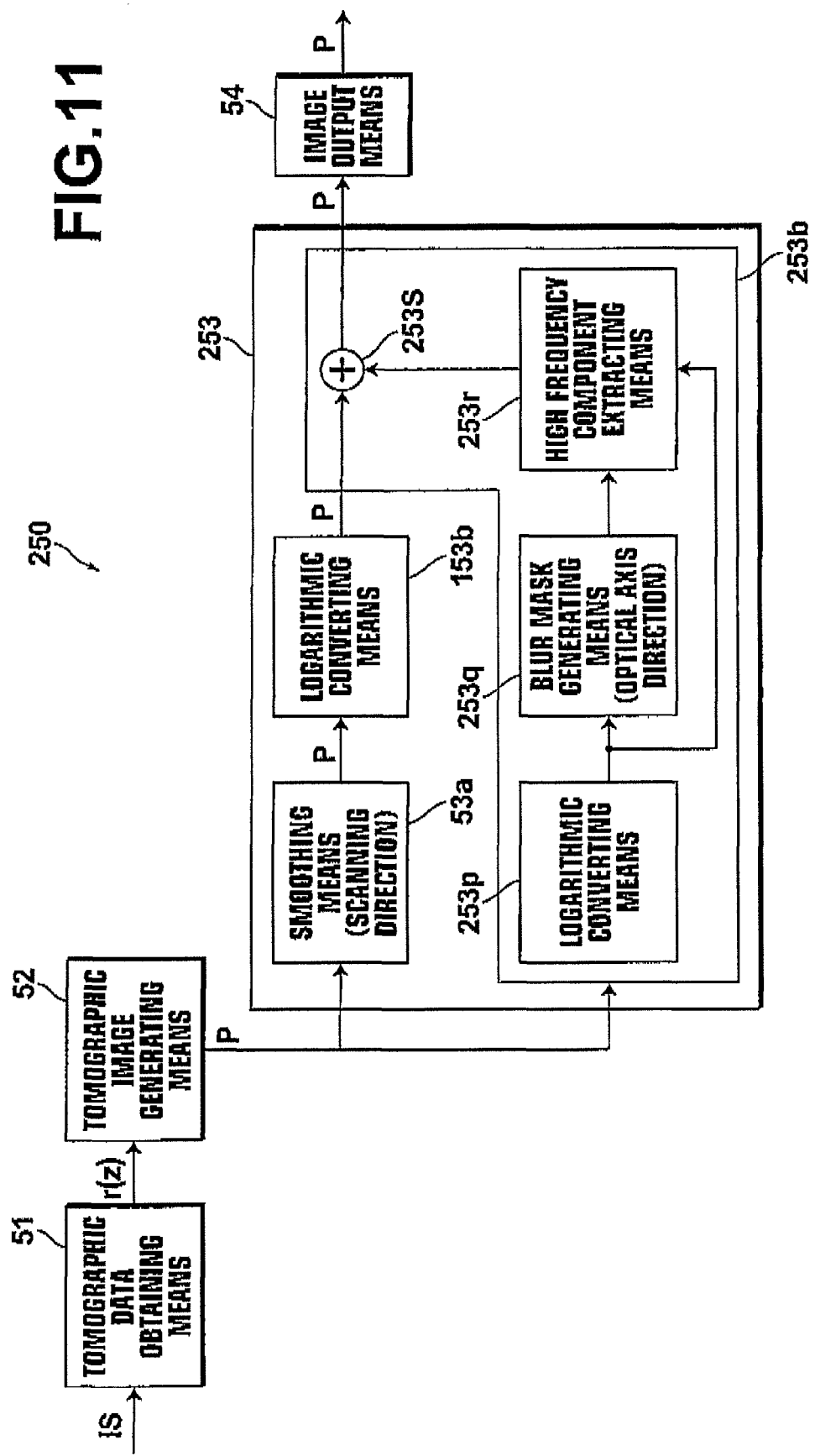
FIG. 11 is a block diagram that illustrates the schematic construction of a tomographic image processing apparatus according to a third embodiment of the present invention.

FIG. 11 is a block diagram that illustrates the schematic construction of a tomographic image processing apparatus 250 according to a third embodiment of the present invention. The tomographic image processing apparatus 250 will be described with reference to FIG. 11. Note that elements of the tomographic image processing apparatus 250 of FIG. 11 which are the same as those of the tomographic image processing apparatus 50 of FIG. 4 and the tomographic image processing apparatus 150 of FIG. 7 will be denoted by the same reference numerals, and detailed descriptions thereof will be omitted, unless particularly necessary.

The tomographic image processing apparatus 250 of FIG. 11 differs from the tomographic image processing apparatuses 50 and 150 in the constitution of a sharpening means 253*b* within an image quality correcting means 253. Specifically, the sharpening means 253*b* comprises: a logarithmic converting means 253*p*, a blur mask generating means 253*q*; a high frequency component extracting means 253*r*; and an adding means 253*s*.

Figure 8:
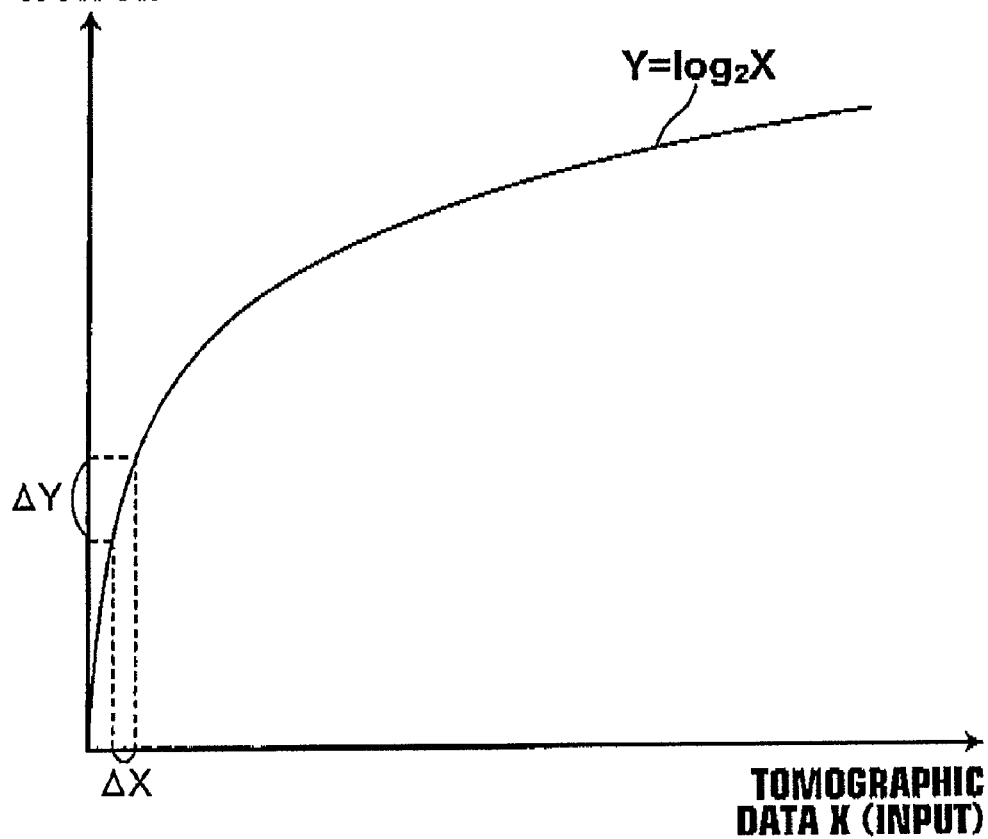
FIG. 8 is a graph that illustrates an example of a logarithmic conversion table of a logarithmic converting means of FIG. 7.

The logarithmic converting means 253*p* administers a logarithmic conversion process on the tomographic image P generated by the tomographic image generating means 52, employing the logarithm conversion table illustrated in FIG. 8.

The blur mask generating means 253*q* administers a smoothing process on the tomographic image P, which has undergone logarithmic conversion administered by the logarithmic converting means 253*p*, with respect to the optical axis direction z, to generate a blur mask image. The blur mask image is subtracted from the tomographic image P, which has undergone logarithmic conversion administered by the logarithmic converting means 253*p*, to obtain an image (=the tomographic image P–the blur mask image), to obtain high frequency components within the tomographic image P in the optical axis direction Z. The adding means 253*s* adds the high frequency components extracted by the high frequency component extracting means 253*r* to the tomographic image P, which has undergone a smoothing process in the scanning direction θ administered by the smoothing means 53*a*, to output a tomographic image P, of which the image quality has been corrected, to the image output means 54.

In the image quality correcting means 253 of FIG. 11, the smoothing means 53*a* the smoothing process on the tomographic image P by the smoothing means 53*a* (step ST23), while the sharpening means 253*b* administers the logarithmic converting process, the blur mask generating process, and the high frequency component extraction process (step ST24), as illustrated in the flow chart of FIG. 12. The high frequency components are added to the tomographic image P, which has undergone the smoothing process, and the tomographic image P, of which the image quality has been corrected, is output from the image output means 54.

In this case as well, the generation of noise and artifacts is suppressed in the tomographic image P with respect to the scanning direction θ, and the generation of blur is prevented in the tomographic image P with respect to the optical axis direction z. Thereby, the image quality of the tomographic image P is improved. Particularly, because the sharpening means 253b extracts the high frequency components from the tomographic image P which has not undergone the smoothing process, high frequency components can be extracted from the original tomographic image P, and a faithful sharpening process can be administered. Further, because the logarithmic conversion process is administered after the smoothing process, the smoothing process is administered prior to the differences in signal values (pixel values) of the tomographic data r(z) are increased. Accordingly, the effects of the smoothing process are not diminished (refer to FIGS. 9A, 9B, 9C, and FIGS. 10A, 10B, 10C).

According to each of the embodiments described above, the light beam L is emitted, and the emitted light beam L is divided into the measuring light beam L1 and the reference light beam L2. Then, the reflected light beam L3, which is the measuring light beam L1 reflected by the measurement target S, and the reference light beam L2 are combined, to form the interference light beam L4. The interference light beam L4 is detected as an interference signal IS. A tomographic image P is generated from a plurality of interference signals IS, which are detected as the measuring light beam L1 is scanned and irradiated on the measurement target S. Then, a spatial frequency process is administered, with the high frequency gain for the measuring light beam L1 in the scanning direction within the tomographic image P being set lower than the high frequency gain for the tomographic image P with respect to the direction of the optical axis of the measuring light beam L1. Thereby, image correction having different properties are administered on the tomographic image P obtained by OCT measurement, to match the characteristics of the tomographic image P in the scanning direction and the optical axis direction of the measuring light beam L1. Accordingly, the image quality of the tomographic image P is improved.

Note that the image quality correcting means 53 administers a smoothing process on the tomographic image P with respect to only the scanning direction θ of the measuring light beam L1. In this case, noise and artifacts in the tomographic image P, which are caused by fluctuations in the wavelength of the measuring light beam L1 that occur in the scanning direction θ during OCT measurement, can be reduced. Therefore, the image quality of the tomographic image P is improved.

In addition, the image quality correcting means 153 as illustrated in FIG. 7 administers a sharpening process on the tomographic image P with respect to only the optical axis direction z of the measuring light beam L1. In this case, blurring in the tomographic image P, which is caused by the light dispersion/absorption properties of the measurement target S, is reduced. Therefore, the image quality of the tomographic image P is improved.

Further, the image quality correcting means 153 administers a logarithmic conversion process on the tomographic image P, after the smoothing process has been administered on the tomographic image P with respect to the scanning direction θ of the measuring light beam L1. In this case, the smoothing process is administered before the differences in pixel values are increased, and therefore the image quality of the tomographic image P is improved.

Further, the image quality correcting means 53 as illustrated in FIG. 4 comprises the smoothing means 53a, for administering a smoothing process on the tomographic image P with respect to the scanning direction θ of the measuring light beam L1; and the sharpening means 53b, for administering a sharpening process on the tomographic image P with respect to the optical axis direction z of the measuring light beam L1. In this case, the aforementioned noise and artifacts in the scanning direction θ as well as blurring in the optical axis direction z can be reduced. Therefore, the image quality of the tomographic image P is improved.

The sharpening means 253b as illustrated in FIG. 8 comprises: the high frequency component extracting means 253r, for extracting high frequency components from the tomographic image P; and the adding means 253s, for adding the extracted high frequency components to the tomographic image P, which has been smoothed by the smoothing means 53a. In this case, the high frequency components are extracted from the tomographic image P prior to the smoothing process being administered. Therefore, sufficient sharpening effects are obtained.

Note that the present invention is not limited to the embodiments described above. For example, an embodiment was described in which the tomographic image generating means 52 of FIG. 4 generates the tomographic image P with the tomographic data r(z) arranged linearly, and the image quality correcting means 53 administers the smoothing process and the sharpening process on this tomographic image P. Alternatively, the tomographic image generating means 52 may generate the tomographic image P with the tomographic data r(z) arranged in a circular shape along the scanning direction θ, and the image quality correcting means 53 may administer the smoothing process and the sharpening process on this tomographic image P.

In addition, cases in which image processes are administered on tomographic images P, which are obtained when the measuring light beams L1 are rotated and scanned. Alternatively, the present invention may be applied to tomographic images P, which are obtained by scanning the measuring light beam L1 in the longitudinal direction of the optical probe 30. As a further alternative, the present invention may be applied to three dimensional tomographic images P, which are obtained by rotating the measuring light beam L1 and scanning in the longitudinal direction of the optical probe 30.

Further, the embodiments described above are for cases in which the present invention is applied to tomographic images P obtained by SS-OCT measurement. Alternatively, the present invention may be applied to tomographic images P obtained by SD-OCT measurement, by a system as illustrated in FIG. 13. A light source unit 10 of FIG. 13 emits a low coherence light beam L within a predetermined wavelength band, and comprises a light source 11, which is an SLD (Super Luminescent Diode), and an optical system 12, for causing the emitted light beam L to enter an optical fiber FB1, for example.

An interference light detecting means 140 detects an interference light beam L4 formed by a combining means 4 combining a reflected light beam L3 and a reference light beam L2. The interference light detecting means 140 comprises: a collimating lens 41, for collimating the interference light beam L4 emitted from an optical fiber FB4; a spectral decomposing means 42, for spectrally decomposing the interference light beam L4, which is constituted by a plurality of wavelength bands, into each of the wavelength bands; an optical system 43, for focusing the interference light beam L4, which has been spectrally decomposed by the spectral decomposing means 42, onto a photodetecting section 44; and the photodetecting section, for detecting each of the wavelength bands of the interference light beam L4, focused thereon by the optical system 43.

The spectral decomposing means 42 is constituted by a diffracting optical element, for example. The spectral decomposing means 42 spectrally decomposes the interference light beam L4 incident thereon, and transmits the spectrally composed light beam L4 toward the photo detecting section 44. The photo detecting section 44 is constituted by elements, such as a CCD (Charge Coupled Device), in which light sensors are arranged either one dimensionally or two dimensionally, and photodiodes. Each of the light sensors respectively detect each wavelength band of the spectrally decomposed interference light beam L4.

In this case as well, a spatial frequency process is administered, with the high frequency gain for the measuring light beam L1 in the scanning direction within the tomographic image P being set lower than the high frequency gain for the tomographic image P with respect to the direction of the optical axis of the measuring light beam L1. Thereby, image correction having different properties are administered on the tomographic image P obtained by OCT measurement, to match the characteristics of the tomographic image P in the scanning direction and the optical axis direction of the measuring light beam L1. Accordingly, the image quality of the tomographic image P is improved.

Further, the present invention is not limited to being applied to tomographic images obtained by FD-OCT measurement, such as the SS-OCT measurement and SD-OCT measurement described above. The present invention may also be applied to tomographic images obtained by TD-OCT measurement, in which tomographic data regarding depth positions of measurement targets S are obtained by driving a reference mirror, and a measuring light beam L1 is scanned by relatively moving the irradiating position of the measuring light beam L1 and the measurement targets S.

What is claimed is:

1. A tomographic image processing method, comprising:
   emitting a light beam;
   dividing the emitted light beam into a measuring light beam and a reference light beam;
   combining a reflected light beam, which is the measuring light beam reflected by a measurement target, with the reference light beam;
   detecting the interference light beam formed by the combined reflected light beam and the reference light beam as an interference signal;
   generating the tomographic image based on a plurality of the interference signals, which are detected while scanning and irradiating the measuring light beam on the measurement target; and
   administering a spatial frequency process, with the high frequency gain for the tomographic image with respect to the scanning direction of the measuring light beam set lower than the high frequency gain for the tomographic image with respect to the direction of the optical axis of the measuring light beam.

2. A tomographic image processing apparatus, comprising:
   a light source unit, for emitting a light beam;
   light dividing means, for dividing the emitted light beam into a measuring light beam and a reference light beam;
   combining means, for combining a reflected light beam, which is the measuring light beam reflected by a measurement target, with the reference light beam;
   interference light detecting means, for detecting the interference light beam formed by the combined reflected light beam and the reference light beam as an interference signal;
   tomographic image generating means, for generating the tomographic image based on a plurality of the interference signals, which are detected while scanning and irradiating the measuring light beam on the measurement target; and
   image quality correcting means, for administering a spatial frequency process, with the high frequency gain for the tomographic image with respect to the scanning direction of the measuring light beam set lower than the high frequency gain for the tomographic image with respect to the direction of the optical axis of the measuring light beam.

3. A tomographic image processing apparatus as defined in claim 2, wherein:
   the image quality correcting means administers a sharpening process to the tomographic image, only with respect to the direction of the optical axis of the measuring light beam.

4. A tomographic image processing apparatus as defined in claim 2, wherein:
   the image quality correcting means administers a smoothing process to the tomographic image, only with respect to the scanning direction of the measuring light beam.

5. A tomographic image processing apparatus as defined in claim 2, wherein:
   the image quality correcting means administers a sharpening process to the tomographic image with respect to the direction of the optical axis of the measuring light beam, and administers a smoothing process to the tomographic image with respect to the scanning direction of the measuring light beam.

6. A tomographic image processing apparatus as defined in claim 5, wherein:
   the image quality correcting means first administers the smoothing process to the tomographic image with respect to the scanning direction of the measuring light beam, and then administers the sharpening process to the tomographic image with respect to the direction of the optical axis of the measuring light beam.

7. A tomographic image processing apparatus as defined in claim 5, wherein:
   the image quality correcting means extracts high frequency components from the tomographic image, administers the smoothing process with respect to the scanning direction of the measuring light beam, then adds the extracted high frequency components to the smoothed tomographic image.

8. A tomographic image processing apparatus as defined in claim 4, wherein:
   the image quality correcting means administers a logarithmic conversion process on the tomographic image, after the smoothing process is administered with respect to the scanning direction of the measuring light beam.

9. A computer readable recording medium having recorded thereon a program that causes a computer to execute the procedures of:
   emitting a light beam;
   dividing the emitted light beam into a measuring light beam and a reference light beam;
   combining a reflected light beam, which is the measuring light beam reflected by a measurement target, with the reference light beam;

detecting the interference light beam formed by the combined reflected light beam and the reference light beam as an interference signal;

generating the tomographic image based on a plurality of the interference signals, which are detected while scanning and irradiating the measuring light beam on the measurement target; and administering a spatial frequency process, with the high frequency gain for the tomographic image with respect to the scanning direction of the measuring light beam set lower than the high frequency gain for the tomographic image with respect to the direction of the optical axis of the measuring light beam.

* * * * *